United States Patent Office 3,301,351
Patented Jan. 31, 1967

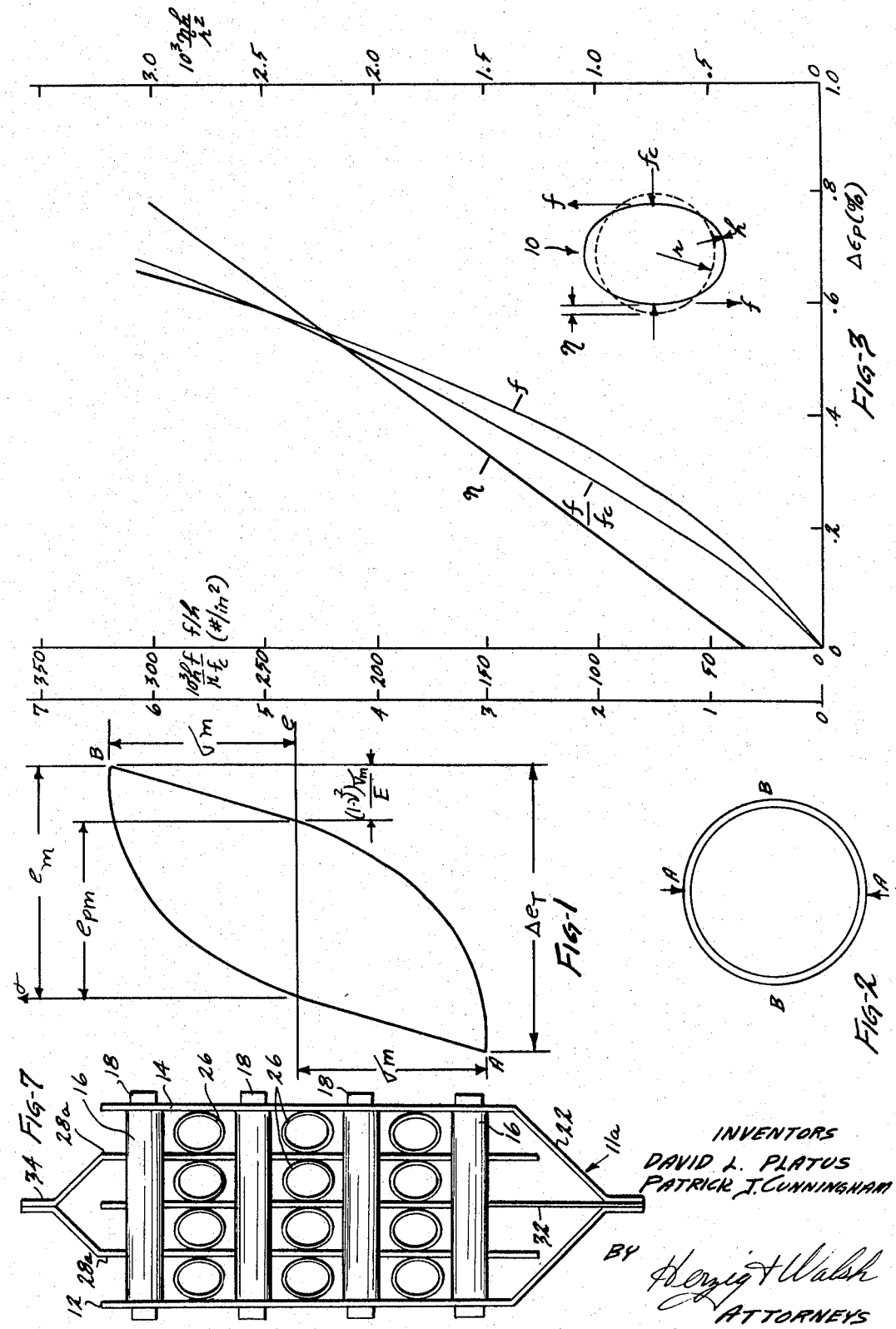

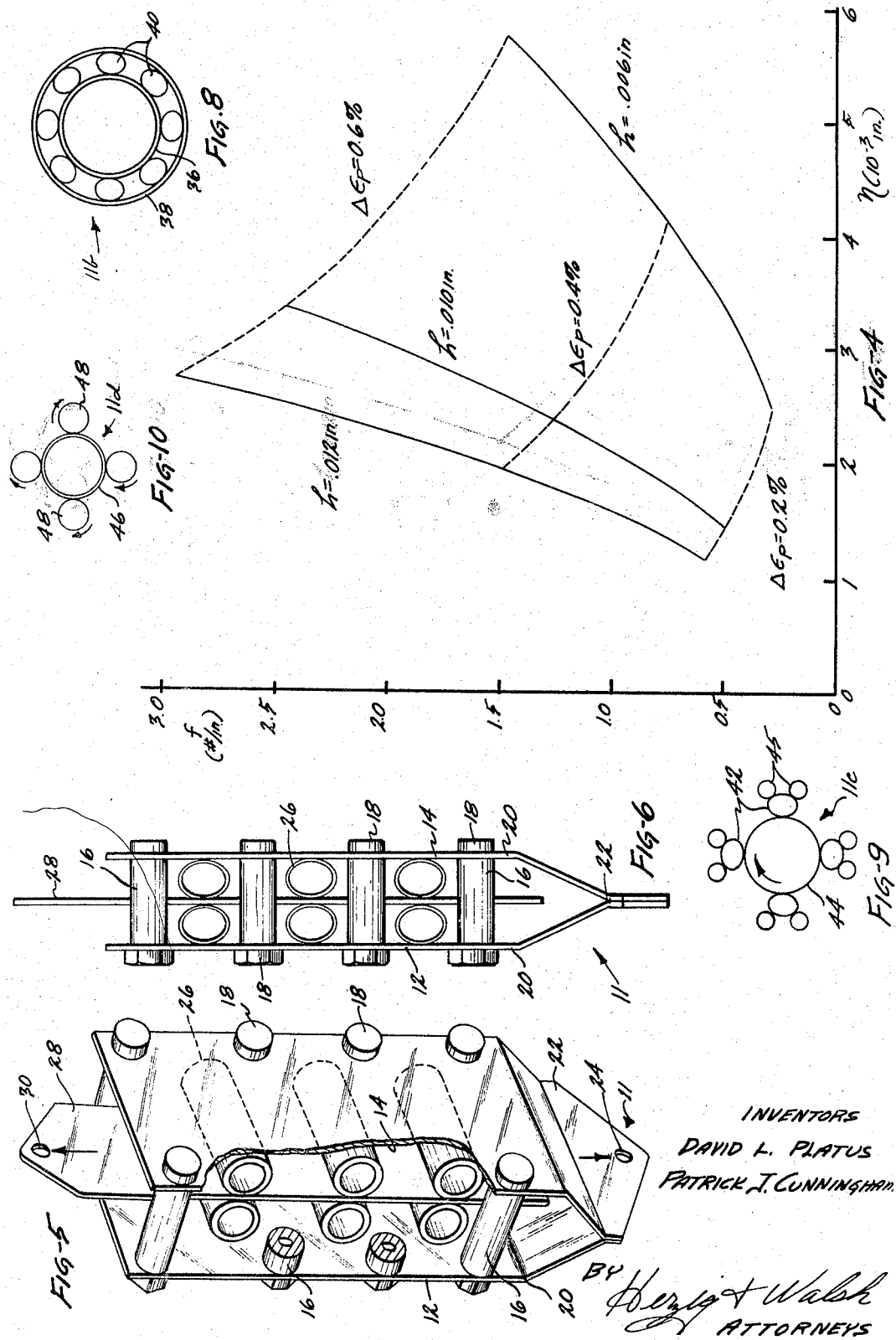

3,301,351
ENERGY ABSORBING DEVICE
David L. Platus, Covina, and Patrick J. Cunningham, Fullerton, Calif., assignors to ARA, Inc. (Aerospace Research Associates, Inc.), West Covina, Calif., a corporation of California
Filed Dec. 16, 1964, Ser. No. 418,842
6 Claims. (Cl. 188—1)

This invention relates to an energy absorbing device, and more particularly to such a device which operates exclusively within the plastic strain range of the energy absorbing material employed in the device. The invention described herein was made in the performance of work under a NASA contract and is subject to the provisions of the National Aeronautics and Space Act of 1958, Public Law 85–568 (72 Stat. 426; 42 U.S.C. 2451), as amended.

A number of shock absorbing devices are known and they may be classified as shock attenuators which absorb unidirectional motion and as dampers which damp vibratory or cyclic motion. Both classes of devices may operate on the principle of absorbing energy by deforming a working material. Dampers usually employ an elastomer as the working material which damps vibratory motion by exhibiting both elastic and plastic deformation over its range of operation. The working material employed in shock attenuators may comprise a ductile metal wherein energy is absorbed by stretching the metal beyond its yield point whereby the material becomes permanently stretched and does not return to its original length when the load is released. In this stretching process, energy is absorbed; this energy is called "strain energy" which is employed to absorb an impulse or shock.

While generally satisfactory, these devices do have certain disadvantages.

By exhibiting both elastic and plastic deformation within its working range, an elastomeric material is unsuitable for use as a structural overload device or mechanical "fuse" which can sustain appreciable loads with negligible deformation because elastomeric materials exhibit an appreciable creep deformation.

Another disadvantage with elastomeric dampers resides in the fact that the elastomeric material does not operate satisfactorily beyond rather limited temperature ranges.

A disadvantage with shock attenuators of the type which stretch a ductile metal beyond its yield point resides in the fact that considerable material must be consumed if large amounts of energy are to be absorbed.

Another disadvantge resides in the fact that the energy absorbing capability of the material is not utilized to maximum advantage by causing it to absorb additional energy by returning the material to its original length. Although some attenuators are known wherein the material is returned to its original length or cyclically deformed into the plastic range and back again into the elastic range, they have the disadvantage that, as they pass back through the elastic range, they return energy previously absorbed.

In view of the foregoing factors and conditions characteristic of energy absorbing devices, it is a primary object of the present invention to provide a new and useful energy absorbing device not subject to the disadvantages enumerated above and which operates within the plastic strain range of the energy absorbing material employed therein efficiently and expeditiously.

Another object of the invention is to provide a rolling tube type of energy absorbing device.

Yet another object of the present invention is to provide an energy absorbing device of the type described having a predetermined load-stroke behavior.

A further object of the present invention is to provide a shock attenuator which operates within a plastic strain range of about 0.1% to 10%.

Another object of the present invention is to provide an energy absorbing device which absorbs unidirectional motion by the cyclic plastic deformation of a metal tube which has been previously deformed into the plastic deformation range, and which is maintained in its deformed condition at all times while serving its energy absorbing function.

According to the present invention, an energy absorbing device is provided which involves the cyclic plastic deformation of a tubular member which is compressed laterally into the plastic range between two parallel surfaces, and then rolled by translating the surfaces relative to each other while keeping the spacing between them fixed. Cyclic bending deformation of the tube wall results due to translation of the points of maximum change in curvature around the circumference as the tube is rolled. Drive can be accomplished by friction between the tube and the contacting surface.

Flexibility in the design may be provided by varying such geometrical parameters as tube diameter, wall thickness, and lateral interference. Further variation in performance may be accomplished through the use of different materials.

The device may be employed for energy absorption applications in which a precisely engineered design is required by predicting the deformation behavior of the tube itself during lateral compression and during subsequent rolling.

In a first embodiment of the invention, a single driving plate is mounted between a plurality of tubular working elements which are deformed into the plastic strain range by outer pressure plates which may be adjusted to impart a predetermined amount of deformation to the tubular working elements.

In a second embodiment of the present invention, both outer and inner pressure plates are employed in conjunction with a pair of driving plates so that a wider range of design parameters is offered in comparison with the device having a single driving plate.

In other embodiments of the present invention, rotary motion is attenuated by employing such arrangements as two concentric drums which rotate relative to each other and drive a series of tubular working elements compressed laterally in the annular region between the drums or by employing a ring of working elements which is driven by a central contacting drum wherein the working elements are rotated in a fixed position with the aid of pairs of bearing guide rollers. Also, a single central working tube may be driven by a peripheral ring of drivers.

In all embodiments of the present invention, the tubular working elements are deformed into a predetermined plastic strain range of from about 0.1% to about 10%.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which like reference characters refer to like elements in the several views.

In the drawings:

FIGURE 1 is a diagrammatic view of a hysteresis loop for a typical fiber to be related to the various circumferential positions of a tube which experiences cyclic bending within its plastic strain range;

FIGURE 2 is a diagrammatic view of a tubular member which may be loaded to produce the hysteresis curve shown in FIGURE 1;

FIGURE 3 is a diagrammatic view of a set of design curves which may be used to select various design parameters for devices of the present invention;

FIGURE 4 is a diagrammatic view of a set of driving force-lateral deflection curves for 0.25-inch OD, 302 stainless steel tubes;

FIGURE 5 is a perspective view, with parts broken away to show internal construction, of an energy absorbing device constituting a first embodiment of the present invention;

FIGURE 6 is an end view of the device of FIGURE 5;

FIGURE 7 is an end view of a device constituting a second embodiment of the present invention;

FIGURE 8 s an end view of an energy absorbing device constituting a third embodiment of the present invention.

FIGURE 9 is an end view of an energy absorbing device constituting a fourth embodiment of the present invention; and FIGURE 10 is an end view of an energy absorbing device constituting a fifth embodiment of the present invention.

Referring again to to the drawings, and particularly to FIGURES 1-4, the energy absorbing devices of the present invention can be provided with a precise load-stroke behavior or onset rate by developing data with which to predict the deformation behavior of the tubes employed in the various embodiments, both during lateral compression and during subsequent rolling. The deformation behavior of a tube during lateral compression is investigated by considering a thin tube 10 (FIGURE 3) of radius $r$ and a wall thickness $h$ which is subjected to two opposed line loads $f_c$. The complete load-deformation behavior as the tube 10 is compressed into the plastic range may be described by the following assumptions:

(1) The tube is compressed uniformly such that the walls are in a state of plane strain bending.

(2) Classical small-deflection bending theory is applicable—i.e., cross sections remain plane.

(3) The stress-strain behavior of the material is the same in tension and compression.

From the foregoing assumptions, in conjunction with symmetry considerations, it is necessary to treat only one-quarter of the tube 10 as a curved cantilever beam such that the change in slope is zero at the free end.

The bending equation can be written $$d\Delta\theta/ds = M/D' \qquad (1)$$

where $d\Delta\theta/ds$ is the change in curvature, S is the arc length, M is the moment per unit axial length (positive in the clockwise direction) and $D'$ is an effective flexural rigidity defined by Equation 1. In the elastic range, $$D' = D = Eh^3/12(1-\nu^2) \qquad (2)$$

where E and $\nu$ are Young's modulus and Poisson's ratio, respectively.

With the moment distribution given by $$M = \frac{f_c}{2} r \cos \varphi - M_A \qquad (3)$$

Equation 1 can be written $$d\Delta\theta = \frac{f_c r^2}{2} \frac{\cos \varphi}{D'(\varphi)} d\varphi - M_A r \frac{d\varphi}{D'(\varphi)} \qquad (4)$$

where $\varphi$ is the angular coordinate measured from the base of the curved cantilever beam and $M_A$ is the negative value of the bending moment at $\varphi = \pi/2$.

It should be noted that, in general, $D'$ is a function of M and, hence, $\varphi$.

The condition that the change in slope be zero at $\varphi=0$ and $\varphi=\pi/2$ requires that $$\int_0^{\pi/2} \left[ \frac{f_c r^2}{2} \frac{\cos \varphi}{D'(\varphi)} - \frac{M_A r}{D'(\varphi)} \right] d\varphi = 0$$

or $$\frac{f_c r}{2} \int_0^{\pi/2} \frac{\cos \varphi d\varphi}{D'(\varphi)} = M_A \int_0^{\pi/2} \frac{d\varphi}{D'(\varphi)} \qquad (5)$$

This relation and a knowledge of $D'$ vs. M, with Equation 3, can be used to determine $M_A$ and $M(\varphi)$ for a given value of $f_c$. It is convenient to introduce the moment at the proportional limit $M_{PL}$, defined by $$M_{PL} = h^2 \sigma_{PL}/6 \qquad (6)$$

where $\sigma_{PL}$ is the proportional limit stress. Equation 5 can then be written in the form $$\int_0^{\pi/2} \frac{\cos \varphi d\varphi}{D'/D(\varphi)} = \frac{\frac{M_A}{M_{PL}}}{\frac{f_c r}{2 M_{PL}}} \int_0^{\pi/2} \frac{d\varphi}{D'/D(\varphi)} \qquad (7)$$

The $D'$ vs. M relation can be calculated using plastic bending theory or determined experimentally. With this relation and Equation 6, various values of $M_A$ can be selected and the integrals of Equation 7 can be evaluated numerically until Equation 7 is satisfied. For these calculations, it is convenient to express $D'/D$ in terms of the nondimensional moment, $M/M_{PL}$, and use Equation 3 expressed in the nondimensional form.

$$\frac{M}{M_{PL}} = \frac{1}{2} \frac{f_c r}{M_{PL}} \cos \varphi - \frac{M_A}{M_{PL}} \qquad (8)$$

When the moment distribution has been determined, the corresponding deformation can be computed by having the curved cantilever beam approximated by a series of short, straight cantilever beams, each having a linear distribution in M and $D'$. The rotations and deflections for each of the incremental cantilever beams are accumulated from the base of the curved cantilever beam and the resulting radial end deflection $\eta$ is determined.

The incremental deformation relations can be written $$\delta_i' = \frac{2}{\lambda} \frac{(M_{i-1}/M_{PL})(l_i/r)}{D'_{i-1}/D} \left[ \frac{1}{\beta_i} \left(1 + \frac{\alpha_i}{\beta_i}\right) l_n (1+\beta_i) - \frac{\alpha_i}{\beta_i} \right]$$

$$\frac{\delta_i}{r} = \frac{2}{\lambda} \frac{(M_{i-1}/M_{PL})(l_i/r)^2}{D'_{i-1}/D} \qquad (9)$$

$$\left\{ \frac{1}{\beta_i}\left(1+\frac{\alpha_i}{\beta_i}\right)\left[\frac{1}{\beta_i}(1+\beta_i)l_n(1+\beta_i) - 1\right] - \frac{\alpha_i}{\beta_i} \right\}$$

where the subscript $i$ designates a quantity evaluated at the end of the $i$-th incremental cantilever, $l_i$=length of $i$-th incremental cantilever, $\sigma_i$=lateral deflection of the end of $i$-th cantilever relative to its base, $\sigma_i'$=slope of the end of $i$-th incremental cantilever relative to its base and $\alpha_i$ and $\beta_i$ are defined by $$\alpha_i \equiv_{i-1} - M_i/M_{i-1} \qquad (10)$$
$$\beta_i \equiv D_i - D_{i-1}/D_{i-1}$$

and $$\lambda \equiv 1/(1-\nu^2) \cdot h/r \cdot E/\sigma_{PL} \qquad (11)$$

With these relations, the contributions to the radial incremental vertical deflection for the $i$-th incremental cantilever beam can be written $$\eta_i - \eta_i - 1 = \left( \delta_i + l_i \sum_{k=0}^{i-1} \sigma' k \right) \sin \overline{\varphi_i} \qquad (12)$$

where $$\eta_0 = \delta_0 = 0$$

and $$\overline{\varphi_i}$$

is the average angular coordinate for the $i$-th increment.

It is important to determine the maximum bending strain that occurs for a given loading condition, since this strain is closely related to the energy absorption capability of the tube during rolling. With the basic assumption of classical bending theory that cross-sections remain plane, the maximum bending strain $\epsilon_m$ is given by $$\epsilon_m = \frac{h}{2}\frac{d\Delta\varphi}{ds} = \frac{h}{2}\frac{M}{D'} \tag{13}$$

or, making use of the previous definitions, $$\epsilon_m = (1-\nu^2)\frac{\sigma_{PL}}{E}\frac{M/M_{PL}}{D'/D} \tag{14}$$

Additional expressions are required to relate the cyclic strain energy to the maximum bending strain so that the driving force can be determined in terms of the lateral compressive force and diametric interference. Consider the hysteresis loop for a typical fiber to be related to the various circumferential positions of the tube 10, as shown in FIGURES 1 and 2. The total strain range $\Delta\epsilon_T$ is the sum of the absolute magnitudes of the bending strains for the fiber at points A and B. For simplicity, the stress-strain curve is assumed to be that of the virgin material and identical in tension and compression. Thus, the size of the hysteresis loop depends only upon the total strain range. Similar loops will be established for different longitudinal fibers located at various distances from the neutral axis (mid-surface) of the tube wall. The strain energy per unit length of tube 10 for one material cycle—i.e., one-half a revolution of the tube 10, $W_p$, is the integral of the loops for each fiber, $w_p$, over the volume $V$ of tube material:

$$W_p = \int w_p dV \tag{15}$$

For identical stress-strain behavior in tension and compression.

$$w_p = 2\int_0^{\epsilon_{pm}} \sigma d\epsilon_p \tag{16}$$

where $\epsilon_{pm}$ is the maximum plastic strain for the particular fiber (FIGURE 1). For many ductile metals and thermoplastic materials in plane strain bending, the stress-strain relation can be approximated in the form $$\epsilon = (1-\nu^2)\sigma/E + \epsilon_{PL}(\sigma/\sigma_{PL})^n \tag{17}$$

where $\Delta\epsilon_{Tm}$ is the total strain range for the outermost $\sigma_{PL}$ is the proportional limit stress, and $n$ is a material constant. The first term on the right is the elastic strain and the second term is the plastic component. Substitution of Equation 17 in Equation 16 and integration yields $$w_p = \frac{2n}{n+1}\sigma_{PL}\epsilon_{PL}\left(\frac{\sigma_m}{\sigma_{PL}}\right)^{n+1} \tag{18}$$

With Equation 18 and $dV = 4\pi r dy$ Equation 15 may be written $$W_p = \frac{8\pi n}{n+1}r\sigma_{PL}\epsilon_{PL}\int_0^{h/2}\left(\frac{\sigma_m}{\sigma_{PL}}\right)^{n+1}dy \tag{19}$$

where $y$ is the distance from the neutral axis. The total strain range $\Delta\epsilon_T$ varies linearly with $y$, according to the relation $$\Delta\epsilon_T = \frac{y}{h/2}\Delta\epsilon_{Tm} \tag{20}$$

where $\Delta\epsilon_{Tm}$ is the total strain range for the outermost fibers. Also, from Equation 17 and FIGURE 1

$$\Delta\epsilon_T = \epsilon_m + (1-\nu^2)\frac{\sigma_m}{E} = 2(1-\nu^2)\frac{\sigma_m}{E} + \epsilon_{PL}\left(\frac{\sigma_m}{\sigma_{PL}}\right)^n \tag{21}$$

For a given value of $\Delta\epsilon_{Tm}$ as determined from the previous curved beam analysis, the corresponding stress $\sigma m_m$, which also corresponds to the value $y = h/2$, can be determined from Equation 21. By selecting several values of $\sigma m$ between zero and $\sigma m_m$, the corresponding values of $\Delta\epsilon_T$ and $y$ can be determined and $W_p$ can then be determined from Equation 19 by numerical integration.

For a simple device, as illustrated in FIGURE 3, the driving force $f$ per unit of lengths of tube 10 is determined by equating the work in one revolution of the tube (the stroke of the device for one revolution of the tube 10 is twice the circumference), $4\pi$ rf, to the cyclic strain energy $2W_p$ to give $$f = W_p/2\pi r \tag{22}$$

The foregoing method may be employed to design tubes for an energy absorbing device of the present invention from a number of different ductile metals and thermoplastic materials such as nylon. One such ductile metal may comprise 302 stainless steel having material constants as follows:

$$E = 28\times10^6 \text{ p.s.i.}$$
$$\nu = 0.3$$
$$\sigma_{PL} = 22,400 \text{ p.s.i.}$$
$$\epsilon_{PL} = 20\times10^{-6}$$
$$n = 5.5$$

For the plastic curved beam analysis an experimental moment-curvature relation for 0.012-inch stainless steel sheet was established by plotting $D'/D$ against $M/M_{PL}$. Moment distributions corresponding to various loading conditions may be solved for by substituting the results of the plastic curved beam analysis into Equations 7 and 8. From the moments at points A and B in FIGURE 1 and 2, the maximum bending strains were computed from Equation 14. The corresponding tube deflections were determined by the incremental technique using Equations 9–12. With the maximum bending strains and, hence, total strain ranges, the plastic strain energy per unit length of tube per cycle, $W_p$, was computed from Equations 19–21, and the driving force relation was computed from Equation 22. Sufficient cases of loading were computed to permit plotting the curves shown in FIGURE 3 in terms of load and deflection parameters, plotted against plastic strain range $\Delta\epsilon_p$. From these curves, it is possible to determine the lateral compressive force $f_c$, the driving force $f$, and the radial deflection $\eta$ vs. $\Delta\epsilon_p$ for particular values of tube radius and thickness.

An application of the design curves of FIGURE 3 is illustrated for the case of a device similar to that shown in FIGURES 5 and 6 which employs standard ¼-inch OD, 302 stainless steel tubes having a suitable tube wall thickness. The various design parameters may be determined from the curves of FIGURE 3. A range of variables may be selected to permit a plastic strain range up to 0.6% for this example. Using these parameters, driving force may be plotted against lateral deflection to produce the curves shown in FIGURE 4.

The foregoing analysis indicates that to absorb energy, the tube 10 must be deformed into the plastic strain range and must then be subjected to cyclic bending by a constant rolling force within this critical range.

Referring now to FIGURES 5 and 6, a device constituting a first embodiment of the present invention, generally designated 11, includes a pair of pressure plates 12, 14 which are connected together in spaced, parallel relationship by a plurality of spacers 16 and bolt and nut assemblies 18. The ends 20 of the plates 12 and 14 are tied together by a Y-shaped member 22 which is provided with an aperture 24 so that the device 11 can be connected to an apparatus to be subjected to shock loads which may be transmitted to the device 11 and absorbed thereby.

A plurality of working elements or tubes 26 are mounted in aligned pairs between the pressure plates 12 and 14. A center driving plate 28 is then inserted into the device 11 to separate the respective pairs of working tubes 26. The tubes 26 may be made of any suitable material, such as a metal or a thermoplastic material such as nylon and are plastically deformed by being compressed laterally between the driving plate 28 and an associated pressure plate 12 or 14 by adjusting the bolt and nut assemblies 18. The tubes 26 may be deformed into the plastic range of deformation until they have a predetermined offset value within the range of 0.1% to 10%, depending upon the amount of shock to be absorbed by the device 11.

An aperture 30 is provided in the driving plate 28 so that it can be connected in an energy absorbing system. The device 11 may be employed in a number of energy absorption applications in which a precisely engineered design is required. For example, the device 11 may be employed as a mechanical "fuse" on a guy wire which is subjected to design loads for long periods of time and, in the event of an earthquake, for example, the device 11 would protect the cable from serious overload. The overload would be absorbed by the tubes 26 by cyclic bending from the constant rolling force imparted therto by the center driving plate 28 and the outer pressure plates 12 and 14 as they translate with respect to each other.

Referring now to FIGURE 7, a second embodiment of the present invention, generally designated 11a, is identical to the first embodiment except that twice as many tubes are employed by using an inner pressure plate 32 in addition to the other pressure plates 12 and 14 and by employing a pair of driving plates 28a which may be tied together at one end by a Y-shaped member 34. Spacers 16 and bolt and nut assemblies 18 are employed as in the previous embodiment and may be adjusted to deform the tubes 26 a predetermined amount.

A third embodiment of the invention, generally designated 11b, is shown in FIGURE 8. The device 11b comprises a pair of concentric drums 36, 38 which are adapted to rotate relative to each other and drive a series of tubular working elements 40. The tubular elements 40 may be made of a metal, such as stainless steel, or a thermoplastic material, such as nylon, and are compressed laterally in the annular region between drums 36 and 38 a predetermined amount so that they are deformed into the aforementioned predetermined plastic strain range.

A device constituting a fourth embodiment of the present invention, generally designated 11c, is shown in FIGURE 9 and comprises a ring of working elements or tubes 42 which are driven by a central, contacting drum 44. A pair of guide bearing rollers 45 is provided for each tube 42 so that the tubes 42 will be rotated in a fixed position by the drum 44. As in the previous embodiments, the tubes 42 may be made of metal or of a thermoplastic material and are laterally compressed until they are deformed into a predetermined plastic strain range of about 0.1% to about 10%.

Referring now to FIGURE 10, a fifth embodiment of the present invention, generally designated 11d, comprises a single working tube 46 which is driven by a peripheral ring of drivers 48. The drivers 48 deform the tube 46 into the aforementioned plastic strain range. The shock absorber 11d offers advantages for high-energy applications in which the working element would be simply replaced periodically. The shock absorbers 11c and 11d offer added flexibility and a possible advantage in that the more complex modes of deformation produce more material cycles per revolution of working tube.

For applications which require a tension device capable of a very large stroke length, any of the rotary devices could be utilized in conjunction with a mechanism for converting rotary to linear motion. Examples of such mechanisms are cord-spool, rack-and-pinion, and friction mechanisms. The rotary devices might also be used in a similar manner for increasing the number of cycles capable from a limited stroke length.

While the particular energy absorbing devices herein shown and described in detail are fully capable of attaining the objects and providing the advantages hereinbefore stated, it is to be understood that they are merely illustrative of the presently preferred embodiments of the invention and that no limitations are intended to details of construction or design herein shown other than as defined in the appended claims.

What is claimed is:

1. An energy absorbing device comprising: a tubular working element comprising a non-elastomeric material; opposed members having opposed surfaces frictionally engaging the periphery of said working element; means holding said opposed members so spaced that they partially flatten said tubular working element sufficiently to radially bend and stress different portions of the material thereof beyond their elastic limits, in tension and compression, respectively; and moving means for relatively moving said members, while maintaining their spacing, so that said surfaces cause said tubular element to roll about its tube axis and thereby to cyclically stress each portion of the material thereof in compression and tension, alternately, beyond its elastic limit whereby plastic deformation thereof absorbs the energy imparted to said members to relatively move the same.

2. An energy absorbing device as defined in claim 1 wherein said non-elastomeric material comprises a ductile metal.

3. An energy absorbing device as defined in claim 1 wherein said non-elastomeric material comprises plastically deformable resin.

4. An energy absorbing device as defined in claim 1 wherein said opposed members are substantially flat parallel plates mounted for relative movement in a direction parallel to the planes thereof.

5. An energy absorbing device as defined in claim 1 wherein said opposed surfaces are substantially cylindrical and concentric, defining an annular space therebetween, said tubular element being positioned in said annular space, said members being relatively rotatable about the common axis of said concentric surfaces.

6. An energy absorbing device as defined in claim 1 wherein said opposed members comprise spaced parallel cylindrical rollers, rotatable about their respective axes, said tubular working element being confined between said rollers.

References Cited by the Examiner
UNITED STATES PATENTS

| | | | |
|---|---|---|---|
| 2,819,060 | 1/1958 | Neidhart. | |
| 2,819,063 | 1/1958 | Neidhart. | |
| 2,910,246 | 10/1959 | Hait | 188—1 X |
| 3,031,034 | 4/1962 | Thomas | 188—1 X |
| 3,034,597 | 5/1962 | Arnold et al. | 188—1 |
| 3,160,233 | 12/1964 | Norman et al. | 188—1 |
| 3,231,049 | 1/1966 | Platus et al. | 188—1 |

DUANE A. REGER, *Primary Examiner.*